May 29, 1945.　　　　P. H. DONALDSON　　　　2,377,292
PHOTOGRAPHIC PROCESS
Filed Sept. 6, 1944

Inventor:
Paul H. Donaldson
by William D. Hall
Attorney

Patented May 29, 1945

2,377,292

UNITED STATES PATENT OFFICE 2,377,292

PHOTOGRAPHIC PROCESS

Paul H. Donaldson, Arlington, Mass.

Application September 6, 1944, Serial No. 552,904

2 Claims. (Cl. 95—5)

This invention relates to a photographic process and more especially to a method of preparing photographic copies with captions and reference lines.

An object of the invention is to provide an improved photographic process and to devise a method of preparing a projection photograph with captions arranged outside of the photographic subject matter in a marginal area. Another object of the invention is to provide a method of furnishing reference lines extending from the captions in the marginal area to points on the subject matter. The invention also aims to provide a simple, cheap and efficient method of making projection photographs.

The nature of the invention and its objects will be more fully understood from the following description of the drawing and discussion relating thereto.

The method of the invention generally consists in preparing from a negative member a photograph in some desired size. The outline of the subject matter reproduced is then traced on tracing paper and captions drawn on the tracing paper in a marginal area outside the outline. A negative is prepared of the outline and captions appearing on the tracing paper. The second negative is cut away at its central portions to receive the first negative. Reference lines are finally drawn on the first negative to comprise a composite negative member which may be utilized to expose a projected image in any desired size with the captions appearing in black and the lead lines appearing in white over the finished photograph subject matter.

Figure 1:
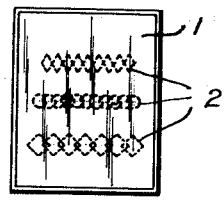
Fig. 1 is a plan view diagrammatically illustrating a photographic negative member utilized with the method of the invention.

Referring more in detail to the drawing, numeral 1 denotes a negative member bearing an exposure of subject matter 2. This negative is of conventional continuous-tone character, 4" by 5" or some other convenient size, and is utilized to make a photograph or positive print in some desired size, which preferably is considerably larger than the size of the negative illustrated in Fig. 1.

Figure 2:
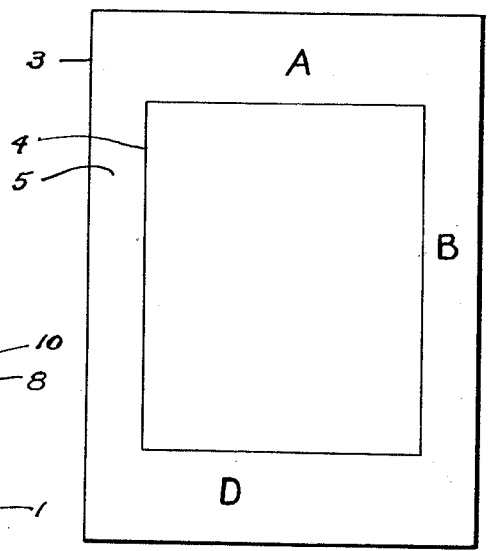
Fig. 2 is a diagrammatic view illustrating a tracing step in the method of the invention.

The positive print is then covered over with a sheet of tracing paper 3, as has been diagrammatically illustrated in Fig. 2 of the drawing. The outline of the positive print is traced on the tracing paper to provide a border 4 which leaves a marginal area 5 occurring all the way around the border 4 in which captions illustrated by the letters A, B and D respectively may be written in or inscribed in some other suitable manner. There are thus obtained on a sheet of tracing paper the border 4 and captions A, B, and D.

Figure 3:
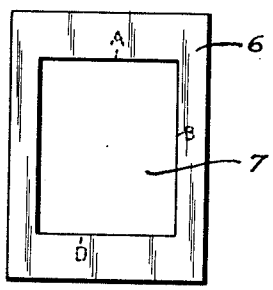
Fig. 3 is a plan view diagrammatically illustrating preparation of a second negative element.
Figure 4:
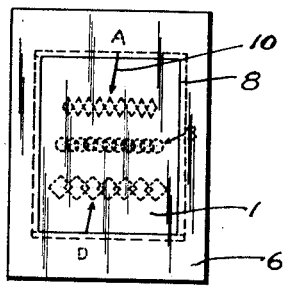
Fig. 4 illustrates a composite negative member.

The tracing paper subject matter is then photographed with another negative member 6, illustrated in Fig. 3 of the drawing. This may consist of a 5" x 7" Kodalith or process film. In carrying out the operation, an image of the border lines 4 formed on the glass screen is adjusted until it is of the same size as the corresponding area indicated by the continuous-tone negative 1. This is readily done with the aid of a pair of dividers. The portion of the negative 6 defined by the border 4 is then cut out to leave a space or opening 7. In this opening is fitted the negative 1, being secured to negative 6 at adjacent edges by some convenient means such as strips of adhesive tape 8. Reference or lead lines 10 are then drawn on the negative 1 with ink, and these lines extend toward the captions.

Figure 5:
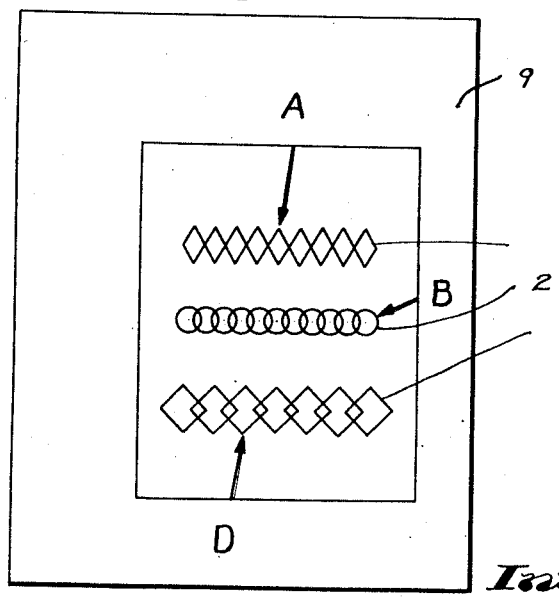
Fig. 5 illustrates a finished projection photograph made in accordance with the invention.

This forms a composite negative which may be exposed in any desired projected size upon a sheet of photographic paper 9, and there are obtained the subject matter 2, the captions A, B, and D in black on the white background, and lead lines extending inwardly from the captions in white against the dark background of the subject matter 2. Preferably the arrangement of the subject matter will be such as that indicated in Fig. 5 to provide a relatively wide margin at the lefthand side for binding purposes.

The method of the invention provides a convenient and efficient means of securing copies properly captioned and identified in various sizes. If the printing comes through too black, the copy of Kodalith negative can be given a light wash of a reagent such as cocine. The dilution of this wash determines the printing density on the projection print. Those portions of the lines which are drawn in on the areas of the first negative will come through as white lines, while portions of the lines drawn in the border 3 may be obtained in black. Since the method uses both original negatives, all of their quality is retained. Also as the combination can be projected, a great deal of flexibility in the size of print is possible.

While I have shown a preferred embodiment of my invention, it should be understood that various changes and modifications may be resorted to, in keeping with the spirit of the invention as defined by the appended claims.

I claim:

1. That improved photographic process which comprises forming a negative of subject matter to be reproduced, preparing a positive from the negative, tracing the outline of the positive subject matter on a tracing sheet, inscribing on the tracing sheet, in a marginal area occurring outside of the outline, captions referring to the subject matter within the border, copying the subject matter thus inscribed on the tracing sheet with a second negative element, removing a central portion of the second negative element as defined by the outlines, and securing in the space remaining the first negative element with adhesive securing means, then drawing on the first negative reference lines which extend between the caption subject matter of the second negative element and points to which the captions apply in the first negative element, and then exposing to provide a positive of the subject matter occurring in both negative members.

2. That improved photographic process which comprises copying with a continuous-tone negative, subject matter desired to be reproduced, forming a positive print from the negative in a relatively larger size, covering the positive print with a tracing sheet, tracing the outline of the subject matter in the positive print, introducing additional subject matter to the tracing sheet, copying the tracing sheet with a second negative element, said second negative being formed of a size whereby the outline copied from the tracing paper corresponds to the size of the said first negative element, cutting away portions of the second negative element occurring inside of the reproduced outline, securing the said first negative element in the resulting space in the second negative element, applying additional subject matter to the composite negative, and then exposing to provide a positive print of the composite negative.

PAUL H. DONALDSON.